US012669972B2

(12) United States Patent
Liu

(10) Patent No.: US 12,669,972 B2
(45) Date of Patent: Jun. 30, 2026

(54) SCREEN PROJECTION METHOD AND APPARATUS, STORAGE MEDIUM AND ELECTRONIC DEVICE

(71) Applicant: SHENZHEN TCL NEW TECHNOLOGY CO., LTD., Shenzhen (CN)

(72) Inventor: Jianshuang Liu, Shenzhen (CN)

(73) Assignee: SHENZHEN TCL NEW TECHNOLOGY CO., LTD., Shenzhen (CN)

( * ) Notice: Subject to any disclaimer, the term of this patent is extended or adjusted under 35 U.S.C. 154(b) by 69 days.

(21) Appl. No.: 18/718,059

(22) PCT Filed: Oct. 18, 2022

(86) PCT No.: PCT/CN2022/126009
§ 371 (c)(1),
(2) Date: Dec. 12, 2024

(87) PCT Pub. No.: WO2023/103599
PCT Pub. Date: Jun. 15, 2023

(65) Prior Publication Data
US 2025/0103270 A1      Mar. 27, 2025

(30) Foreign Application Priority Data
Dec. 10, 2021    (CN) .......................... 202111509769.2

(51) Int. Cl.
*G06F 3/14*        (2006.01)
*H04N 21/431*      (2011.01)
*H04N 21/4363*     (2011.01)

(52) U.S. Cl.
CPC ....... *G06F 3/1454* (2013.01); *H04N 21/4316* (2013.01); *H04N 21/43637* (2013.01)

(58) Field of Classification Search
CPC .... G06F 3/1454; G09G 5/14; H04N 21/4316; H04N 21/43637
See application file for complete search history.

(56) References Cited

U.S. PATENT DOCUMENTS

| 12,242,767 B2 * | 3/2025 | Oh ........................ H04N 21/436 |
| 2004/0014526 A1 * | 1/2004 | Kulas ........................ G09G 5/14 |
| | | 463/43 |

(Continued)

FOREIGN PATENT DOCUMENTS

| CN | 105224310 A | 1/2016 |
| CN | 106790714 A | 5/2017 |

(Continued)

OTHER PUBLICATIONS

International Search Report in International application No. PCT/CN2022/126009, mailed on Jan. 5, 2023.

(Continued)

*Primary Examiner* — Koosha Sharifi-Tafreshi
(74) *Attorney, Agent, or Firm* — PV IP PC; Wei Te Chung

(57)        ABSTRACT

The present disclosure discloses a screen projection method and apparatus, a storage medium and an electronic device, which relate to the technical field of Internet of Things. The method comprises: building a screen projection protocol channel corresponding to each terminal; receiving screen projection content; creating a screen projection management page and an independent window decoupler; creating a decoupled window on the basis of the independent window decoupler corresponding to each terminal; and displaying the screen projection content of the corresponding terminal in each decoupled window. The present disclosure improves the screen projection adjustability and reduces the management cost.

17 Claims, 3 Drawing Sheets

(56)        References Cited

U.S. PATENT DOCUMENTS

| | | | |
|---|---|---|---|
| 2013/0268837 A1 | 10/2013 | Braithwaite et al. | |
| 2015/0294646 A1* | 10/2015 | Lee ....................... | G06F 3/1454 |
| | | | 345/2.3 |
| 2019/0007467 A1 | 1/2019 | Powell et al. | |
| 2024/0053944 A1* | 2/2024 | Jia ........................... | G09G 5/14 |

FOREIGN PATENT DOCUMENTS

| | | | |
|---|---|---|---|
| CN | 108205458 A | 6/2018 |
| CN | 112256370 A | 1/2021 |
| CN | 112394892 A | 2/2021 |
| CN | 112511598 A | 3/2021 |
| CN | 113691850 A | 11/2021 |
| CN | 114217759 A | 3/2022 |
| JP | H0785087 A | 3/1995 |

OTHER PUBLICATIONS

Written Opinion of the International Search Authority in International application No. PCT/CN2022/126009, mailed on Jan. 5, 2023.
Chinese Office Action issued in corresponding Chinese Patent Application No. 202111509769.2 dated Feb. 5, 2024, pp. 1-9.
Chinese Office Action issued in corresponding Chinese Patent Application No. 202111509769.2 dated on Jul. 25, 2024, pp. 1-5.

* cited by examiner

500

Screen casting device

Channel establishment module          510

Content receiving module          520

Decoupler creation module          530

Window creation module          540

Display module          550

603

Power supply

601

602

Memory

Processor

Input unit

604

SCREEN PROJECTION METHOD AND APPARATUS, STORAGE MEDIUM AND ELECTRONIC DEVICE

This application is a US national phase application based upon an International Application No. PCT/CN2022/126009, filed on Oct. 12, 2022, which claims priority to Chinese Application No. 202111509769.2, entitled "SCREEN PROJECTION METHOD AND APPARATUS, STORAGE MEDIUM AND ELECTRONIC DEVICE", filed on Dec. 10, 2021. The entire disclosures of the above applications are incorporated herein by reference.

FIELD OF THE INVENTION

The application relates to the field of the Internet of Things technology, and specifically to a screen casting method, device, storage medium and electronic device.

BACKGROUND

Screen casting is the task of transferring the content of some devices to be displayed to a screen casting device. For example, for a screen casting requirement, a connection can be established between a small screen device and a large screen device, and the small screen device transfers the content of the screen casting to the large screen device for display.

SUMMARY

Technical Problem

In some current screen casting solutions, due to poor compatibility of the screen casting protocols, there are solutions for screen casting by means of complex screen casting pages or window configurations, especially in the scenario of multiple screen casting protocols for terminals casting to the same terminal, there is a complex page management and a large number of interface expansions are required, which leads to poor adjustability of the screen casting, and a high cost of screen casting management.

Solution to Technical Problem

Technical Solution

Embodiments of the application provide a screen casting solution that can effectively improve the adjustability of screen casting and reduce the cost of screen casting management.

In order to solve the above technical problems, the embodiment of the present disclosure provides the following technical scheme:

According to an embodiment of the present disclosure, a screen casting method comprises: in response to screen casting requests sent by a plurality of terminals, establishing a screen casting protocol channel corresponding to each terminal; receiving, through the screen casting protocol channel corresponding to each terminal, a screen casting content sent by each terminal; creating a screen casting management page and an independent window decoupler corresponding to each terminal; creating a decoupling window corresponding to each terminal in the screen casting management page based on the independent window decoupler corresponding to each terminal; and displaying the screen casting content sent by the terminal corresponding to each decoupling window in each decoupling window, so as to display the screen casting contents of the terminals in the screen casting management page.

According to an embodiment of the present disclosure, the creating the screen casting management page and the independent window decoupler corresponding to each terminal comprises: creating a screen casting management page; creating an independent window control carrier corresponding to each terminal in the screen casting management page; and using the independent window control carrier corresponding to each terminal as the independent window decoupler corresponding to each terminal.

According to an embodiment of the present disclosure, a layout manager is preset in the screen casting screen management page; and creating the independent window control carrier corresponding to each terminal in the screen casting management page comprising: in the screen casting management page, creating a window extension class object inherited from an interface layout component for each terminal separately; loading the window extension class object for each terminal into the screen casting management page through the layout manager to display the independent window control carrier corresponding to each terminal within the screen casting management page.

According to an embodiment of the present disclosure, the creating the decoupling window corresponding to each terminal in the screen casting management page based on the independent window decoupler corresponding to each terminal comprises: creating a window interface component inherited from a window class in the independent window decoupler corresponding to each terminal to generate the decoupling window corresponding to each terminal in the screen casting management page.

According to an embodiment of the present disclosure, the creating the screen casting management page comprises: creating a globally unique page extension class object inherited from a page component; launching the page extension class object to display the screen casting management page.

According to an embodiment of the present disclosure, the displaying the screen casting content sent by the terminal corresponding to each decoupling window in each decoupling window comprises: determining the number of the screen casting requests; adjusting a display state of the independent window decoupler corresponding to each terminal according to the number so that the independent window decoupler corresponding to each terminal adjusts a display state of the decoupling window corresponding to each terminal; displaying, in each decoupling window after adjustment of the display state, the screen casting content sent by the terminal corresponding to each decoupling window.

According to an embodiment of the present disclosure, the establishing the screen casting protocol channel corresponding to each terminal in response to the screen casting requests sent by the terminals comprises: receiving the screen casting requests sent by the terminals; identifying a screen casting protocol corresponding to each terminal based on the screen casting request of each terminal; establishing the screen casting protocol channel corresponding to each terminal based on the screen casting protocol corresponding to each terminal.

According to an embodiment of the present disclosure, a projection device comprises: a channel establishment module for responding to a projection request sent by a plurality of terminals, establishing a projection protocol channel corresponding to each terminal; the content receiving module is used for receiving the projection content sent by each terminal through a projection protocol channel corresponding to each terminal; the decoupler creation module is used for creating a projection management page and an independent window decoupler corresponding to each terminal; the window creation module is used for creating a decoupling window corresponding to each terminal in the projection management page based on an independent window decoupler corresponding to each terminal; the display module is used for displaying the projection content sent by the terminal corresponding to each decoupling window in each decoupling window, so as to display the projection content of the plurality of terminals in the projection management page.

According to another embodiment of the present disclosure, a storage medium on which a computer-readable instruction is stored, and when the computer-readable instruction is executed by a processor of a computer, the computer performs the method described in the embodiment of the present disclosure.

According to another embodiment of the present disclosure, an electronic device comprises: a memory storing computer-readable instructions; and a processor reading the computer-readable instructions stored in the memory to perform the methods described in the embodiments of the present disclosure.

Beneficial Effect of the Present Disclosure

Advantageous Effect

In the embodiments of the application, in response to screen casting requests sent by a plurality of terminals, a screen casting protocol channel corresponding to each terminal is established; a screen casting content sent by each terminal is received through the screen casting protocol channel corresponding to each terminal; a screen casting management page and an independent window decoupler corresponding to each terminal are created; a decoupling window corresponding to each terminal is created in the screen casting management page based on the independent window decoupler corresponding to each terminal; and the screen casting content sent by the terminal corresponding to each decoupling window is displayed in each decoupling window, so as to display the screen casting contents of the terminals in the screen casting management page.

In this way, by creating a unique screen casting management page and an independent window decoupler corresponding to each terminal, a decoupling window corresponding to each terminal can be created within the unique screen casting management page based on the independent window decoupler, which can reliably and conveniently cast the screen casting contents corresponding to multiple terminals to the same terminal (i.e., the screen casting receiving terminal). When facing the demand of screen casting under multiple screen casting protocols, it can realize simple and convenient management of the screen casting management page, and the creation of the decoupling window for the content of the screen casting management page does not require a lot of interface expansion, thus effectively improving the adjustability in the face of the diversity of screen casting protocols and effectively reducing the cost of screen casting management.

BRIEF DESCRIPTION OF DRAWINGS

Description of the Drawings

In order to more clearly illustrate the technical solutions in the embodiments of the present disclosure, the drawings required to be used in the description of the embodiments will be briefly introduced below, and it is obvious that the drawings described below are only some embodiments of the present disclosure, and for those skilled in the art, other drawings can be obtained according to these drawings without creative labor.

Figure 1:
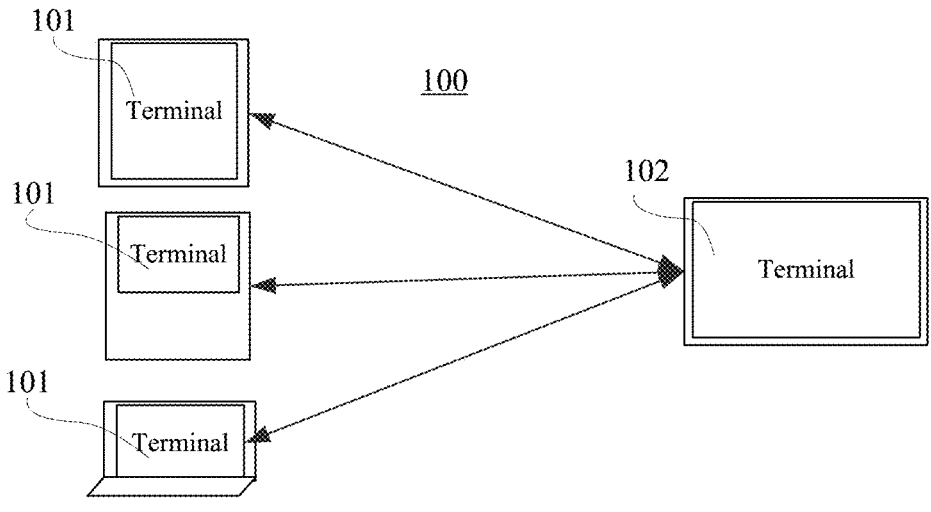

FIG. 1 is a schematic diagram of a system to which embodiments of the present disclosure can be applied.

Figure 2:
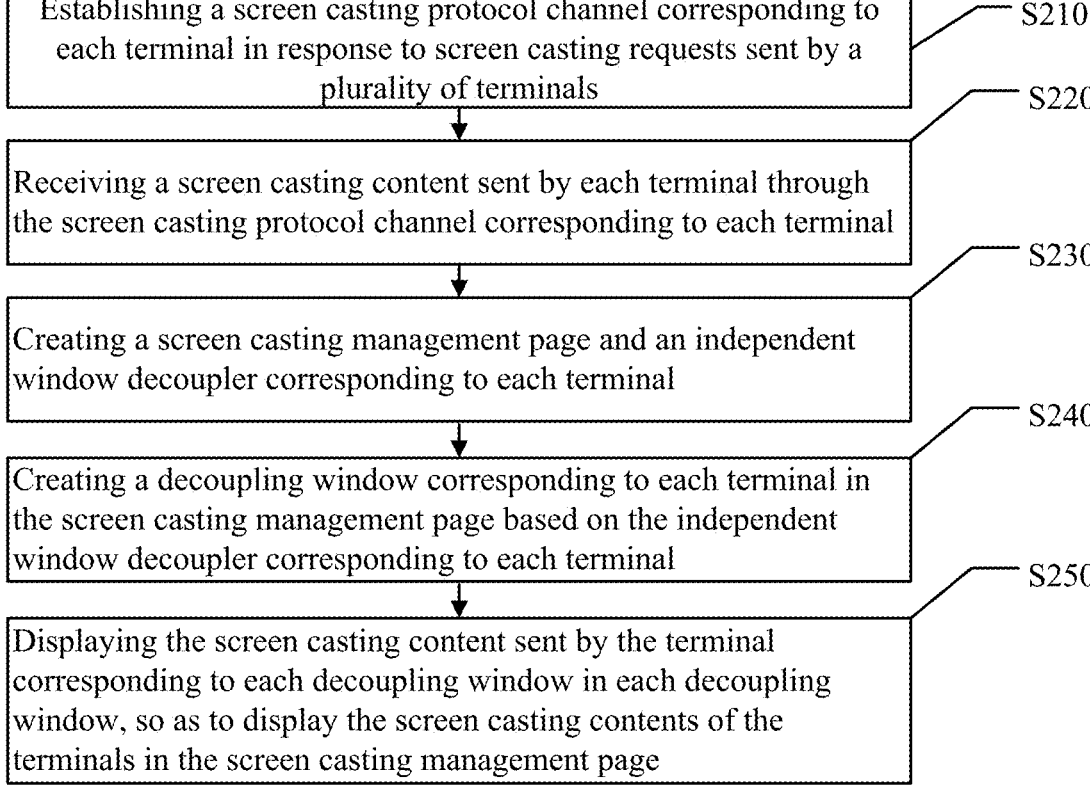

FIG. 2 is a flowchart illustrating a screen casting method according to an embodiment of the present disclosure.

Figure 3:
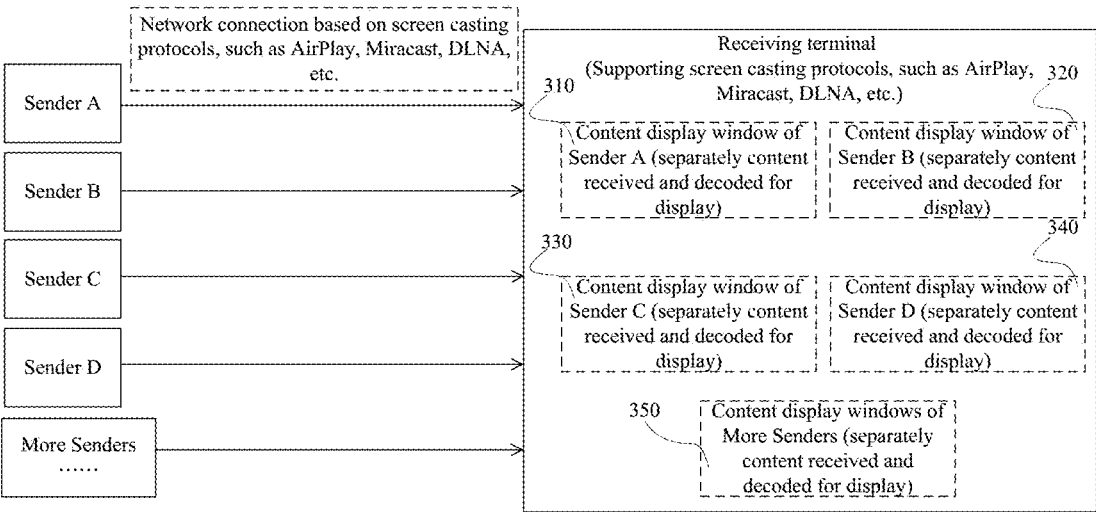

FIG. 3 is a flowchart of a screen casting process in a scenario according to the present disclosure.

Figure 4:
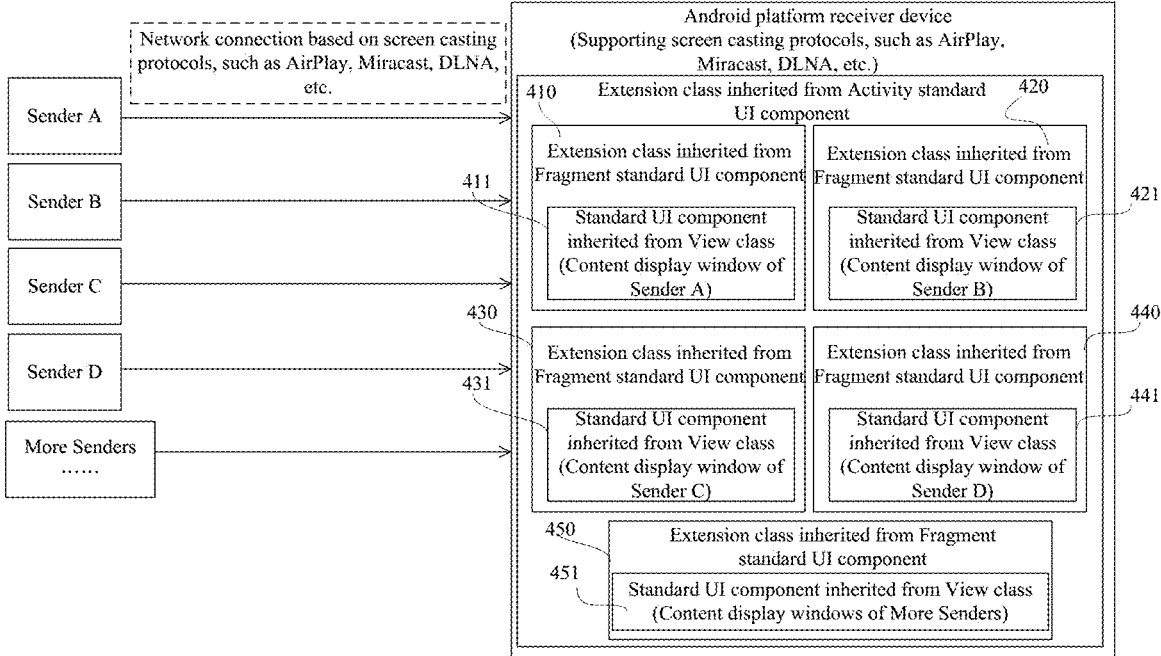

FIG. 4 is a flowchart of the screen casting process according to the embodiment shown in FIG. 3.

Figure 5:
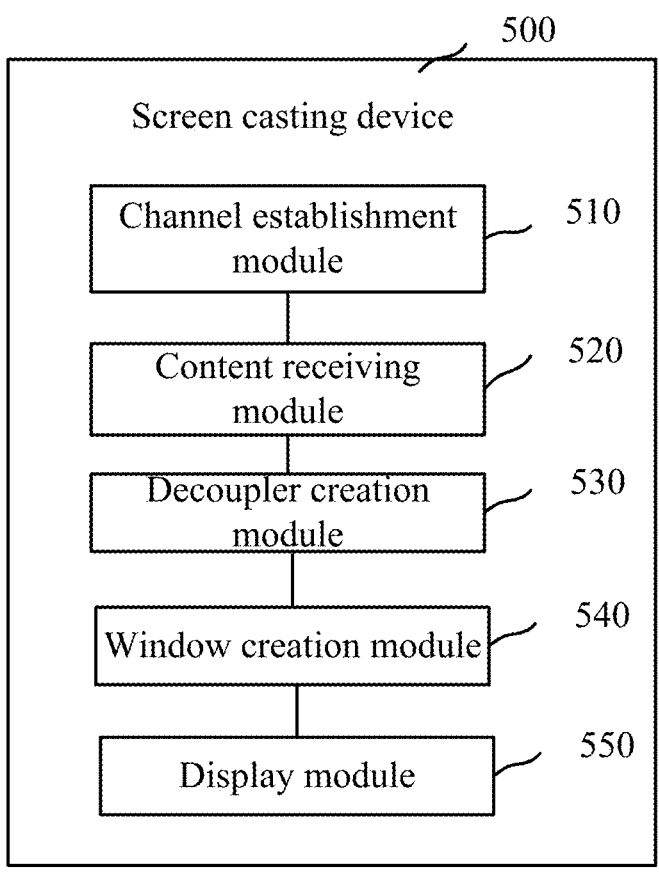

FIG. 5 is a block diagram illustrating a screen casting device according to an embodiment of the present disclosure.

Figure 6:
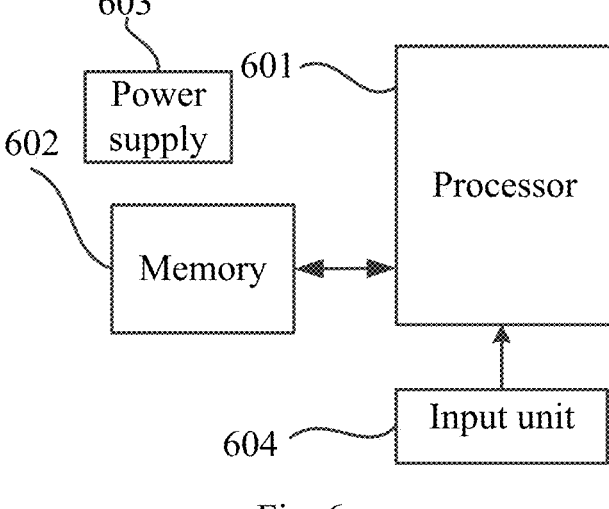

FIG. 6 is a block diagram illustrating an electronic device according to an embodiment of the present disclosure.

EMBODIMENT OF THE PRESENT DISCLOSURE

Detailed Description of the Present Disclosure

The technical solutions in the embodiments of the present disclosure will be clearly and completely described below in conjunction with the accompanying drawings in the embodiments of the present disclosure, and it is obvious that the described embodiments are only part of the embodiments of the present disclosure, not all embodiments. Based on the embodiments in the present disclosure, all other embodiments obtained by a person skilled in the art without creative work fall within the scope of protection of the present disclosure.

In the following description, the specific embodiments of the present disclosure will be illustrated with reference to the steps and symbols performed by one or more computers, unless otherwise stated. Thus, these steps and operations will be referred to several times as being performed by a computer, and the computer execution referred to in this article includes operations performed by a computer processing unit that represents an electronic signal of data in a structured form. This transformation of the data or the maintenance of the data at a location in the computer's memory system that can be reconfigured or otherwise altered in a way that is familiar to testers in the art. The data structure maintained by the data is the physical location of the memory, which has specific characteristics defined by the data format. However, the principle of the application is explained in the above text, which does not represent a limitation, and testers in this art will be able to understand that the various steps and operations described below can also be implemented in hardware.

FIG. 1 illustrates a schematic diagram of a system 100 to which embodiments of the present disclosure can be applied. The system 100 may comprise multiple terminals 101 and a terminal 102. The terminal 101 can be any computer device, such as a computer, a tablet, a mobile phone, a smartwatch, a home appliance device and so on, and the number of multiple terminals 101 can be one or at least two. The home appliance device can be a television, an air conditioner, a water heater and other device. The terminal 102 can be an electronic device that receives a screen casting content, such as a television, a set-top box, and other electronic devices.

The terminals 101 cast their own screen casting content to the terminal 102 based on their own supported screen casting protocols, which may include, but are not limited to, a variety of standard or customized screen casting protocols such as AirPlay, Miracast, DLNA, and the like; and the screen casting content may include, but are not limited to, screen mirroring, videos, audios, pictures, and other content.

The plurality of terminals 101 and the terminal 102 can be connected through a wired or wireless connection, and the plurality of terminals 101 and the terminal 102 can be connected directly or indirectly.

In one embodiment of this example, the terminal 102 may respond to screen casting requests sent by the plurality of terminals 101 to establish a screen casting protocol channel corresponding to each terminal 101; receive a screen casting content sent by each terminal 101 through the screen casting protocol channel corresponding to each terminal 101; create a screen casting management page and an independent window decoupler corresponding to each terminal 101; create a decoupling window corresponding to each terminal 101 in the screen casting management page based on the independent window decoupler corresponding to each terminal 101; and display the screen casting content sent by the terminal 101 corresponding to each decoupling window in each decoupling window, so as to display the screen casting contents of the multiple terminals 101 in the screen casting management page.

In one example, referring to FIG. 3, the plurality of terminals 101 may include a sender A, a sender B, a sender C, a sender D, and more senders (the more senders may be at least one), and a corresponding decoupling window (i.e., a content display window) may be created for each of the terminals, including a decoupling window 310 corresponding to the sender A, a decoupling window 320 corresponding to the sender B, a decoupling window 330 corresponding to the sender C, a decoupling window 340 corresponding to the sender D, and decoupling windows 350 corresponding to the more senders, wherein each decoupling window separately receives and decodes and displays the screen casting contents sent by the corresponding terminal.

FIG. 2 schematically illustrates a flow chart of a screen casting method according to an embodiment of the present disclosure. The screen casting method can be performed by any device, such as the terminal 101 or the terminal 102 as shown in FIG. 1.

The screen casting method can include steps S210 to S250.

In step S210, in response to screen casting requests sent by a plurality of terminals, a screen casting protocol channel corresponding to each terminal is established;

In step S220, a screen casting content sent by each terminal is received through the screen casting protocol channel corresponding to each terminal;

In step S230, a screen casting management page and an independent window decoupler corresponding to each terminal are created;

In step S240, a decoupling window corresponding to each terminal is created in the screen casting management page based on the independent window decoupler corresponding to each terminal; and In step S250, the screen casting content sent by the terminal corresponding to each decoupling window is displayed in each decoupling window, so as to display the screen casting contents of the terminals in the screen casting management page.

The following describes the specific process of each step when performing the screen casting.

In step S210, in response to the screen casting requests sent by the plurality of terminals, a screen casting protocol channel corresponding to each terminal is established.

In this example implementation, the plurality of terminals can be computers, tablets, mobile phones, smart watches, home appliances, and so on. The screen casting protocol channel is a network connection channel based on a screen casting protocol, which is the protocol that transmits content on one device to be displayed on another device through a network.

The plurality of terminals may support different screen casting protocols, for example, the plurality of terminals may include four, wherein one terminal supports the AirPlay screen casting protocol, two terminals support the Miracast screen casting protocol, and one terminal supports the DLNA screen casting protocol.

The screen casting request may be sent to the screen casting receiving terminal by the user by triggering the screen casting control on the sender device (i.e., the multiple terminals), and the screen casting request may carry relevant information of the terminal (e.g., the terminal identification, the screen casting protocol identification, and the screen casting content, etc.), and the screen casting receiving terminal may quickly establish a screen casting protocol channel based on the relevant information upon reception of the screen casting request, and the corresponding screen casting protocol channel of each terminal is independent of each other.

In one embodiment, establishing the screen casting protocol channel corresponding to each terminal in response to the screen casting requests sent by the terminals comprises:

Receiving the screen casting requests sent by the terminals; identifying a screen casting protocol corresponding to each terminal based on the screen casting request of each terminal; and establishing the screen casting protocol channel corresponding to each terminal based on the screen casting protocol corresponding to each terminal.

The screen casting request sent by each terminal may include a terminal identification (e.g., a terminal address) corresponding to each terminal as well as a screen casting protocol identification, etc. After receiving the screen casting request, the screen casting receiving terminal may identify the screen casting protocol corresponding to the terminal that sends the screen casting request, and then establish a network connection channel (i.e., the screen casting protocol channel) between the terminal that sends the screen casting request and the screen casting receiving terminal based on the identified screen casting protocol.

For example, if the terminal A sends a screen casting request to the screen casting receiving terminal via the screen casting protocol P1, the screen casting receiving terminal may establish a network connection channel C1 with the terminal A based on the screen casting protocol P1; The terminal B sends a screen casting request to the screen casting receiving terminal via the screen casting protocol P2, and the screen casting receiving terminal may establish a network connection channel C2 with the terminal B based on the screen casting protocol P2.

In step S220, the screen casting content sent by each terminal is received through the screen casting protocol channel corresponding to each terminal.

Each terminal may send the screen casting content to the screen casting receiving terminal based on its own screen casting protocol through its own corresponding screen casting protocol channel, and the screen casting terminal may display the screen casting content after receiving the screen casting content sent by each terminal. Among them, the screen casting content may include, but is not limited to, screen mirroring, video, audio, pictures, and other content.

In step S230, the screen casting management page and the independent window decoupler corresponding to each terminal are created.

In this example implementation, the screen casting management page is a globally unique screen casting page on the screen casting receiving terminal, and the screen casting contents of the multiple terminals are displayed within the screen casting management page, which can be automatically created by the page creation code. The independent window decoupler is an independent constraint component used to constrain the parameters and state of the display window, and a corresponding independent window decoupler can be created for each terminal by calling a preset window decoupler. Among them, each terminal corresponds to an independent window decoupler, and the independent window decouplers corresponding to a plurality of terminals are independent of each other.

In one embodiment, creating the screen casting management page and the independent window decoupler corresponding to each terminal may comprise: a screen casting management page and an independent window decoupler corresponding to each terminal are created may comprise:

Creating a screen casting management page; creating an independent window control carrier corresponding to each terminal in the screen casting management page; and using the independent window control carrier corresponding to each terminal as the independent window decoupler corresponding to each terminal.

In this embodiment, the independent window decoupler corresponding to each terminal can be created by creating the independent window control carrier corresponding to each terminal within the screen casting management page, wherein the independent window control carrier is a carrier component that can carry a display window and control parameters and states of the display window, and the independent window decoupler can be created conveniently and efficiently by creating the independent window control carrier.

In one embodiment, creating a screen casting management page may comprise: creating a globally unique page extension class object inherited from a page component; and launching the page extension class object to display the screen casting management page.

The page component is the Activity standard UI component, and the screen casting receiving terminal may create a globally unique page extension class object inherited from the Activity standard UI component, and launch the page extension class object to display the Activity page (i.e., the screen casting management page). Referring to FIG. 4, in one example, the screen casting receiving terminal is an Android platform receiver device, and the Android platform receiver device can display an Activity page (i.e., a screen casting management page) 400 by creating a globally unique page extension class object inherited from the Activity standard UI component and launching the page extension class object, in which the Page (i.e., the screen casting management page) 400 is the extension class inherited from the Activity standard UI component.

In one embodiment, a layout manager is preset in the screen casting screen management page; and creating the independent window control carrier corresponding to each terminal in the screen casting management page may comprise:

In the screen casting management page, creating a window extension class object inherited from an interface layout component for each terminal separately; and loading the window extension class object for each terminal into the screen casting management page through the layout manager to display the independent window control carrier corresponding to each terminal within the screen casting management page.

The preset layout manager is a component predefined for managing the window extension class objects, and an example preset layout manager can be a FragmentManager class object within the Activity page. The interface layout component may be a component that organizes the layout of the interface within the screen casting management page, and in one example, the interface layout component can be a Fragment standard UI component.

The screen casting receiving terminal may, for each terminal, create a window extension class object inherited from the interface layout component within the screen casting management page, and then load the window extension class object of each terminal within the screen casting management page through the preset layout manager, which may conveniently and efficiently manage the window extension class object and organize the interface layout within the screen casting management page to display the independent window control corresponding to each terminal.

Referring to FIG. 4, multiple terminals may include a sender A, a sender B, a sender C, a sender D, and more senders (the more senders may be at least one). The screen casting receiving terminal may create, for the sender A, the sender B, the sender C, the sender D, and the more senders, an independent window control carrier 410 corresponding to the sender A, an independent window control carrier 420 corresponding to the sender B, an independent window control carrier 430 corresponding to the sender C, an independent window control carrier 440 corresponding to the sender D, and independent window control carriers 450 corresponding to the more senders, respectively. Each terminal has its own window control carrier, which is an extension class inherited from the Fragment standard UI component.

In step S240, based on the independent window decoupler corresponding to each terminal, a decoupling window corresponding to each terminal is created in the screen casting management page.

The independent window decoupler is an independent constraint component for constraining the parameters and states of the display window, and the display window can be created within the independent window decoupler corresponding to each terminal, and then the parameters and states of the display window can be separately constrained based on the independent window decoupler corresponding to each terminal in the screen casting management page, so as to obtain the decoupling window corresponding to each terminal, wherein the decoupling windows between multiple terminals are independent of each other.

In one embodiment, creating the decoupling window corresponding to each terminal in the screen casting management page based on the independent window decoupler corresponding to each terminal may comprise:

Creating a window interface component inherited from a window class in the independent window decoupler corresponding to each terminal to generate the decoupling window corresponding to each terminal in the screen casting management page.

The window class can be a View class, and the window interface component is a standard UI component inherited from the View class, and the screen casting receiving terminal can create the standard UI component inherited from the View class within each independent window decoupler, and then generate the decoupling window corresponding to each terminal based on the standard UI component inherited from the View class.

In one example, the independent window decoupler is an independent window control carrier, referring to FIG. 4, the screen casting receiving terminal creates an independent window control carrier 410 corresponding to a sender A, an independent window control carrier 420 corresponding to a sender B, an independent window control carrier 430 corresponding to a sender C, an independent window control carrier 440 corresponding to a sender D, and independent window control carrier 450 corresponding to more senders for the sender A, the sender B, the sender C, the sender D and the more senders, respectively.

The screen casting receiving terminal may create a window interface component inherited from the window class within each independent window carrier to generate a decoupling window corresponding to each terminal in the screen casting management page, create a decoupling window 411 within the independent window control carrier 410, create a decoupling window 421 within the independent window control carrier 420, create a decoupling window 431 within the independent window control carrier 430, create a decoupling window 441 within the independent window control carrier 440, and create a decoupling window 451 within independent window control carrier 450, each decoupling window being a standard UI component inherited from the View class.

In step S250, the screen casting content sent by the terminal corresponding to each decoupling window is displayed in each decoupling window to display the screen casting contents of the multiple terminals within the screen casting management page.

In this example implementation, for example, referring to FIG. 4, the screen casting content sent by the terminal (i.e., the sender A) corresponding to the decoupling window 411 may be displayed in decoupling window 411, the screen casting content sent by the terminal (i.e., the sender B) corresponding to the decoupling window 421 may be displayed in the decoupling window 421, and so on, and the screen casting content sent by the terminal corresponding to each decoupling window may be displayed in each decoupling window, thus displaying the screen casting contents of the terminals in a screen casting management page (e.g., the screen casting management page 400).

In one embodiment, displaying the screen casting content sent by the terminal corresponding to each decoupling window in each decoupling window may comprise:

Determining the number of the screen casting requests; adjusting a display state of the independent window decoupler corresponding to each terminal according to the number so that the independent window decoupler corresponding to each terminal adjusts a display state of the decoupling window corresponding to each terminal; and displaying, in each decoupling window after adjustment of the display state, the screen casting content sent by the terminal corresponding to each decoupling window.

The number of screen casting requests is the total number of the multiple terminals, such as 1 or 5, etc. The screen casting receiving terminal may adjust the display state of the independent window decoupler corresponding to each terminal according to the total number, such as displaying all the independent window decouplers in equal parts in a tiled manner within the screen casting management page, or highlighting the independent window decoupler corresponding to a specific terminal in combination with the weighting information (e.g., importance of the screen casting content marked on the terminal) in a specific screen casting request.

By adjusting the display state of the independent window decoupler corresponding to each terminal, it is possible to make the independent window decoupler corresponding to each terminal conveniently and reliably constrain to adjust the display state of the decoupling window corresponding to each terminal during a change process to obtain the decoupling window after the adjustment of the display state.

In one example, the screen casting receiving terminal may adjust the display parameters and state of the Fragment component (i.e., the independent window control carrier) on the Activity page according to the total number of objects of the Fragment extension class and the business needs, such as displaying multiple Fragment components in equal parts in a tiled manner, highlighting a specific Fragment component, etc., and then adjust the display parameters and states of the View component (i.e., the decoupling window) inside the Fragment component through the Fragment component.

In this way, based on steps S210 to S250, in response to screen casting requests sent by a plurality of terminals, a screen casting protocol channel corresponding to each terminal is established; a screen casting content sent by each terminal is received through the screen casting protocol channel corresponding to each terminal; a screen casting management page and an independent window decoupler corresponding to each terminal are created; a decoupling window corresponding to each terminal is created in the screen casting management page based on the independent window decoupler corresponding to each terminal; and the screen casting content sent by the terminal corresponding to each decoupling window is displayed in each decoupling window, so as to display the screen casting contents of the terminals in the screen casting management page.

By creating a unique screen casting management page and an independent window decoupler corresponding to each terminal, a decoupling window corresponding to each terminal can be created within the unique screen casting management page based on the independent window decoupler, which can reliably and conveniently cast the screen casting contents corresponding to multiple terminals to the same terminal (i.e., the screen casting receiving terminal). When facing the demand of screen casting under multiple screen casting protocols, it can realize simple and convenient management of the screen casting management page, and the creation of the decoupling window for the content of the screen casting management page does not require a lot of interface expansion, thus effectively improving the adjustability in the face of the diversity of screen casting protocols and effectively reducing the cost of screen casting management.

The present disclosure can realize the screen casting method of multi-instance (i.e., multiple terminals) without relying on specific screen casting protocols, which can support multiple standard or customized screen casting protocols such as AirPlay, Miracast, DLNA, etc., and display the screen casting contents from multiple senders on a single screen casting receiving terminal at the same time through multiple different screen casting protocols, which can enable the user to focus on the contents of multiple senders at the same time, thereby improving the efficiency of obtaining information.

The multi-instance screen casting method of the present disclosure adopts the scheme of a single Activity page+ multiple Fragment components (i.e., a unique screen casting management page+multiple independent window decouplers) scheme, and compared to the multi-Activity page scheme in related technologies, there is no need to care about the complex management among multiple Activity pages that are detached from the Android specification, including life cycle, focus switching, dynamic layout, etc. It can directly place multi-Fragment components in a FragmentManager class object on a single Activity page for decoupling display; compared with the scheme of single Activity page+multiple view components in related technologies, it can avoid a large number of interface extensions on the standard UI components inherited from the View class, which is convenient for decoupling and adjusting the business layout for different screen casting instances, and reducing the management cost of a single Activity for multiple screen casting instances.

To facilitate the better implementation of the screen casting method provided by the embodiments of the present disclosure, the embodiments of the application also provide a screen casting device based on the screen casting method. The meanings of the terms therein are the same as those in the above-mentioned screen casting method, and the specific implementation details can be referred to the description in the method embodiments. FIG. 5 is a block diagram illustrating a screen casting device according to an embodiment of the present disclosure.

As shown in FIG. 5, the screen casting device 500 may comprise a channel establishment module 510, a content receiving module 520, a decoupler creation module 530, a window creation module 340 and a display module 350.

The channel establishment module 510 may be configured to establish a screen casting protocol channel corresponding to each terminal in response to screen casting requests sent by a plurality of terminals; the content receiving module 520 may be used to receive screen casting content sent by each said terminal through the screen casting protocol channel corresponding to each said terminal receive a screen casting content sent by each terminal through the screen casting protocol channel corresponding to each terminal; the decoupler creation module 530 may be used to create a screen casting management page and an independent window decoupler corresponding to each terminal; the window creation module 540 may be used to create a decoupling window corresponding to each terminal in the screen casting management page based on the independent window decoupler corresponding to each terminal; the display module 550 may be used to display the screen casting content sent by the terminal corresponding to each decoupling window in each decoupling window, so as to display the screen casting contents of the plurality of terminals in the screen casting management page.

In one embodiment, the decoupler creation module 530 may comprise: a page creation unit for creating a screen casting management page; a carrier creation unit for creating an independent window control carrier corresponding to each terminal in the screen casting management page; and a carrier determination unit for using the independent window control carrier corresponding to each terminal as the independent window decoupler corresponding to each terminal.

In one embodiment, a layout manager is preset within the screen casting management page; and the carrier creation unit is configured to: create a window extension class object inherited from an interface layout component for each terminal separately in the screen casting management page; load the window extension class object for each terminal into the screen casting management page through the layout manager to display the independent window control carrier corresponding to each terminal within the screen casting management page.

In one embodiment, the window creation module 540 may comprise: a window interface component creation unit for creating a window interface component inherited from a window class in the independent window decoupler corresponding to each terminal to generate the decoupling window corresponding to each terminal in the screen casting management page.

In one embodiment, the page creation unit is configured for: creating a globally unique page extension class object inherited from a page component; and launching the page extension class object to display the screen casting management page.

In one embodiment, the display module 550 comprises: a number determination unit for determining the number of screen casting requests; an adjusting unit for adjusting the display state of the independent window decoupler corresponding to each terminal according to the number, so that the independent window decoupler corresponding to each terminal adjusts the display state of the decoupling window corresponding to each terminal; and a display unit for displaying the screen casting content sent by the terminal corresponding to each decoupling window in each decoupling window after adjusting the display state.

In one embodiment, the channel establishment module 510 comprises: a request receiving unit for receiving screen casting requests sent by multiple terminals; an identification unit for identifying a screen casting protocol corresponding to each terminal based on the screen casting request of each terminal; and a protocol channel establishment unit for establishing a screen casting protocol channel corresponding to each terminal based on the screen casting protocol corresponding to each terminal.

In this way, the screen casting device 500 can reliably and conveniently project the screen casting contents corresponding to multiple terminals to the same terminal (i.e., the screen casting receiving terminal) by creating a unique screen casting management page and an independent window decoupler corresponding to each terminal, and creating a decoupling window corresponding to each terminal based on the independent window decoupler within the unique screen casting management page. When facing the demand of screen casting under multiple screen casting protocols, it can realize simple and convenient management of the screen casting management page, and the creation of the decoupling window for the content of the screen casting management page does not require a lot of interface expansion, thus effectively improving the adjustability in the face of the diversity of screen casting protocols and effectively reducing the cost of screen casting management.

It should be noted that, although several modules or units of the equipment used for the execution of actions are mentioned in the detailed description above, this division is not mandatory. In fact, the features and functions of two or more modules or units described above may be concretized in a module or unit according to the embodiment of the present disclosure. Conversely, the features and functions of a module or unit described above can be further divided into multiple modules or units to concretize.

The embodiments of the present disclosure also provide an electronic device, which can be a terminal or a server, as shown in FIG. 6, which shows a schematic diagram of the structure of the electronic device involved in the embodiment of the present disclosure.

The electronic device may include a processor 601 with one or more processing cores, a memory 602 with one or more computer-readable storage medium, a power supply 603, an input unit 604 and other components. It will be appreciated by those skilled in the art that the structure of the electronic device illustrated in FIG. 6 does not constitute a limitation of the electronic device, and may include more or fewer components than illustrated, or a combination of certain components, or a different arrangement of components.

The processor 601 is the control center of the electronic equipment, which utilizes various interfaces and lines to connect various parts of the entire computer equipment, and performs various functions and processing data of the computer equipment by running or executing software programs and/or modules stored in the memory 602, and calling the data stored in the memory 602, so as to carry out overall monitoring of the electronic equipment. Optionally, the processor 601 may include one or more processing cores; Preferably, the processor 601 can integrate an application processor and a modem processor, wherein the application processor mainly processes the operating system, the user page and the application, etc., and the modem processor mainly processes wireless communication. It is understandable that the aforementioned modem processor can also be left unintegrated into the processor 601.

The memory 602 can be used to store software programs and modules, and the processor 601 performs various functional applications and data processing by running the software programs and modules stored in memory 602. The memory 602 may mainly comprise a storage program area and a storage data area, wherein the storage program area can store the operating system, at least one function required application (such as sound playback function, image playback function, etc.); The storage data area can store data created based on the use of computer equipment, etc. In addition, memory 602 may include high-speed random access memory and may include non-volatile memory, such as at least one disk storage device, flash memory device, or other volatile solid-state memory device. Correspondingly, memory 602 may also include a memory controller to provide access from processor 601 to memory 602.

The electronic equipment also comprises a power supply 603 that supplies power to each component, and preferably, the power supply 603 can be logically connected with the processor 601 through a power management system, so that functions such as managing charging, discharging, and power consumption management are realized through the power management system. The Power Supply 603 can also include any component such as one or more DC or AC power sources, recharging systems, power fault detection circuits, power converters or inverters, and power status indicators.

The electronic device may also include an input unit 604 that can be used to receive input numeric or character information and to generate keyboard, mouse, joystick, optical or trackball signal input related to user settings and function control.

Although not shown, the electronic device may also include a display unit and the like, which will not be described herein. Specifically, in this embodiment, the processor 601 in the electronic device will load executable files corresponding to the processes of one or more applications into the memory 602 in accordance with the following instructions, and the processor 601 will run the applications stored in the memory 602, so as to realize the various functions in the foregoing embodiments of the present disclosure, e.g., the processor 601 may execute operations of the screen casting methods as follows:

In response to screen casting requests sent by a plurality of terminals, establishing a screen casting protocol channel corresponding to each terminal; receiving, through the screen casting protocol channel corresponding to each terminal, a screen casting content sent by each terminal; creating a screen casting management page and an independent window decoupler corresponding to each terminal; creating a decoupling window corresponding to each terminal in the screen casting management page based on the independent window decoupler corresponding to each terminal; and displaying the screen casting content sent by the terminal corresponding to each decoupling window in each decoupling window, so as to display the screen casting contents of the terminals in the screen casting management page.

In some embodiments of the present disclosure, upon creating the screen casting management page and the independent window decoupler corresponding to each terminal, the processor 410 may perform: creating a screen casting management page; creating an independent window control carrier corresponding to each terminal in the screen casting management page; and using the independent window control carrier corresponding to each terminal as the independent window decoupler corresponding to each terminal.

In some embodiments of the present disclosure, a layout manager is preset in the screen casting screen management page; and creating the independent window control carrier corresponding to each terminal in the screen casting management page, the processor 410 may perform: in the screen casting management page, creating a window extension class object inherited from an interface layout component for each terminal separately; loading the window extension class object for each terminal into the screen casting management page through the layout manager to display the independent window control carrier corresponding to each terminal within the screen casting management page.

In some embodiments of the present disclosure, upon creating the decoupling window corresponding to each terminal in the screen casting management page based on the independent window decoupler corresponding to each terminal, the processor 410 may perform: creating a window interface component inherited from a window class in the independent window decoupler corresponding to each terminal to generate the decoupling window corresponding to each terminal in the screen casting management page.

In some embodiments of the present disclosure, upon creating the screen casting management page, the processor 410 may perform: creating a globally unique page extension class object inherited from a page component; launching the page extension class object to display the screen casting management page.

In some embodiments of the present disclosure, upon displaying the screen casting content sent by the terminal corresponding to each decoupling window in each decoupling window, the processor 410 may perform: determining the number of the screen casting requests; adjusting a display state of the independent window decoupler corresponding to each terminal according to the number so that the independent window decoupler corresponding to each terminal adjusts a display state of the decoupling window corresponding to each terminal; displaying, in each decoupling window after adjustment of the display state, the screen casting content sent by the terminal corresponding to each decoupling window.

In some embodiments of the present disclosure, upon establishing the screen casting protocol channel corresponding to each terminal in response to the screen casting requests sent by the terminals, the processor 410 may perform: receiving the screen casting requests sent by the terminals; identifying a screen casting protocol corresponding to each terminal based on the screen casting request of each terminal; establishing the screen casting protocol channel corresponding to each terminal based on the screen casting protocol corresponding to each terminal.

A person skilled in the art may understand that all or part of the steps in the various methods of the above embodiments may be completed by a computer program or by controlling the relevant hardware through a computer program, and the computer program may be stored in a computer-readable storage medium and loaded and executed by a processor.

For this purpose, the embodiment of the present disclosure also provides a storage medium in which a computer program is stored, the computer program being capable of being loaded by a processor to perform steps in any of the screen casting methods provided in the embodiments of the present disclosure.

The storage medium can include: Read Only Memory (ROM), Random Access Memory (RAM), disks or optical discs, etc.

Because the computer program stored in the storage medium can perform the steps in any of the methods provided in the embodiments of the present disclosure, the beneficial effects that can be achieved by the methods provided in the embodiments of the present disclosure can be realized, see the previous embodiments for details, and will not be repeated herein.

A person skilled in the art will be apt to think of other embodiments of the present disclosure after considering the embodiments disclosed herein in the specification and practice. The application is intended to cover any variants, uses, or adaptations of the present disclosure, which follow the general principles of the present disclosure and include common knowledge or customary technical means in the art not disclosed in the present disclosure.

It should be understood that the present disclosure is not limited to the embodiments that have been described above and illustrated in the accompanying drawings, but may be subject to various modifications and alterations without departing from the scope thereof.

What is claimed is:

1. A screen casting method, comprising:
in response to screen casting requests sent by a plurality of terminals, establishing a screen casting protocol channel corresponding to each terminal;
receiving, through the screen casting protocol channel corresponding to each terminal, a screen casting content sent by each terminal;
creating a screen casting management page and an independent window decoupler corresponding to each terminal;
creating a window interface component inherited from a window class in the independent window decoupler corresponding to each terminal to generate a decoupling window corresponding to each terminal in the screen casting management page; and
displaying the screen casting content sent by the terminal corresponding to each decoupling window in each decoupling window, so as to display the screen casting contents of the terminals in the screen casting management page.

2. The method of claim 1, wherein creating the screen casting management page and the independent window decoupler corresponding to each terminal comprises:
creating a screen casting management page;

creating an independent window control carrier corresponding to each terminal in the screen casting management page; and
using the independent window control carrier corresponding to each terminal as the independent window decoupler corresponding to each terminal.

3. The method of claim 2, wherein a layout manager is preset in the screen casting screen management page; and creating the independent window control carrier corresponding to each terminal in the screen casting management page comprising:
in the screen casting management page, creating a window extension class object inherited from an interface layout component for each terminal separately;
loading the window extension class object for each terminal into the screen casting management page through the layout manager to display the independent window control carrier corresponding to each terminal within the screen casting management page.

4. The method of claim 2, wherein creating the screen casting management page comprises:
creating a globally unique page extension class object inherited from a page component;
launching the page extension class object to display the screen casting management page.

5. The method of claim 1, wherein displaying the screen casting content sent by the terminal corresponding to each decoupling window in each decoupling window comprises:
determining the number of the screen casting requests;
adjusting a display state of the independent window decoupler corresponding to each terminal according to the number so that the independent window decoupler corresponding to each terminal adjusts a display state of the decoupling window corresponding to each terminal;
displaying, in each decoupling window after adjustment of the display state, the screen casting content sent by the terminal corresponding to each decoupling window.

6. The method of claim 1, wherein establishing the screen casting protocol channel corresponding to each terminal in response to the screen casting requests sent by the terminals comprises:
receiving the screen casting requests sent by the terminals;
identifying a screen casting protocol corresponding to each terminal based on the screen casting request of each terminal;
establishing the screen casting protocol channel corresponding to each terminal based on the screen casting protocol corresponding to each terminal.

7. The method of claim 4, wherein the page component comprises an Activity standard UI component, and the screen casting management page comprises an Activity page.

8. The method of claim 3, wherein the screen casting management page comprises an Activity page, the preset layout manager is a FragmentManager class object inside the Activity page, the interface layout component is a Fragment standard UI component, and the independent window control carrier corresponding to each terminal is an extension class inherited from the Fragment standard UI component.

9. The method of claim 1, wherein the window class comprises a View class, and the window interface component is a standard UI component inherited from the View class.

10. The method of claim 5, wherein adjusting the display state of the independent window decoupler corresponding to each terminal according to the number comprises one of the following methods:

displaying the independent window decoupler corresponding to each terminal in equal parts in a tiled manner within the screen casting management page;

highlighting the independent window decoupler corresponding to the terminal according to weight information in the screen casting request corresponding to the terminal.

11. An electronic device, comprising:

a memory storing computer-readable instructions; and a processor reading the computer-readable instructions stored in the memory to perform operations comprising:

in response to screen casting requests sent by a plurality of terminals, establishing a screen casting protocol channel corresponding to each terminal;

receiving, through the screen casting protocol channel corresponding to each terminal, a screen casting content sent by each terminal;

creating a screen casting management page and an independent window decoupler corresponding to each terminal;

creating a window interface component inherited from a window class in the independent window decoupler corresponding to each terminal to generate a decoupling window corresponding to each terminal in the screen casting management page; and displaying the screen casting content sent by the terminal corresponding to each decoupling window in each decoupling window, so as to display the screen casting contents of the terminals in the screen casting management page.

12. The electronic device of claim 11, wherein the creating the screen casting management page and the independent window decoupler corresponding to each terminal comprises:

creating a screen casting management page;

creating an independent window control carrier corresponding to each terminal in the screen casting management page; and using the independent window control carrier corresponding to each terminal as the independent window decoupler corresponding to each terminal.

13. The electronic device of claim 12, wherein a layout manager is preset in the screen casting screen management page; and creating the independent window control carrier corresponding to each terminal in the screen casting management page comprising:

in the screen casting management page, creating a window extension class object inherited from an interface layout component for each terminal separately;

loading the window extension class object for each terminal into the screen casting management page through the layout manager to display the independent window control carrier corresponding to each terminal within the screen casting management page.

14. The electronic device of claim 12, wherein the creating the screen casting management page comprises:

creating a globally unique page extension class object inherited from a page component;

launching the page extension class object to display the screen casting management page.

15. The electronic device of claim 11, wherein displaying the screen casting content sent by the terminal corresponding to each decoupling window in each decoupling window comprises:

determining the number of the screen casting requests;

adjusting a display state of the independent window decoupler corresponding to each terminal according to the number so that the independent window decoupler corresponding to each terminal adjusts a display state of the decoupling window corresponding to each terminal;

displaying, in each decoupling window after adjustment of the display state, the screen casting content sent by the terminal corresponding to each decoupling window.

16. The electronic device of claim 11, wherein establishing the screen casting protocol channel corresponding to each terminal in response to the screen casting requests sent by the terminals comprises:

receiving the screen casting requests sent by the terminals;

identifying a screen casting protocol corresponding to each terminal based on the screen casting request of each terminal;

establishing the screen casting protocol channel corresponding to each terminal based on the screen casting protocol corresponding to each terminal.

17. The electronic device of claim 14, wherein the page component comprises an Activity standard UI component, and the screen casting management page comprises an Activity page.

* * * * *